United States Patent [19]
Mortensen et al.

[11] Patent Number: 5,615,131
[45] Date of Patent: Mar. 25, 1997

[54] SYSTEM FOR PROVIDING CLOSED CAPTIONING TO AN ELECTRONIC DISCUSSION GROUP

[75] Inventors: Owen J. Mortensen; Jeffery S. Dalton; Jeffrey S. Miller; Douglas P. Chinnock, all of Tucson, Ariz.

[73] Assignee: CompuServe Incorporated, Columbus, Ohio

[21] Appl. No.: 667,444

[22] Filed: Jun. 21, 1996

Related U.S. Application Data

[62] Division of Ser. No. 402,110, Mar. 10, 1995, Pat. No. 5,563,804.

[51] Int. Cl.$^6$ .................................................. H04N 1/42
[52] U.S. Cl. ............................... 364/514 A; 395/326
[58] Field of Search ............... 364/514 A; 340/825.19; 348/6, 10, 12, 15; 395/154, 155, 161

*Primary Examiner*—Emanuel T. Voeltz
*Assistant Examiner*—Thomas Peeso
*Attorney, Agent, or Firm*—Standley & Gilcrest

[57] ABSTRACT

An electronic discussion group includes interaction with closed captioning from a media program, in substantially real time. Video clips from the program may also be displayed on users' computer terminals.

3 Claims, 6 Drawing Sheets

SYSTEM FOR PROVIDING CLOSED CAPTIONING TO AN ELECTRONIC DISCUSSION GROUP

This is a divisional application of U.S. patent application Ser. No. 08/402,110 filed Mar. 10, 1995 now U.S. Pat. No. 5,563,804, entitled SYSTEM FOR PROVIDING CLOSED CAPTIONING TO AN ELECTRONIC DISCUSSION GROUP.

BACKGROUND AND SUMMARY OF THE INVENTION

The present invention is generally related to the technology of electronic discussion groups on computer networks, and more particularly to a system for providing closed captioning from television programming directly to an electronic discussion group.

Closed captioning (or "CC") has recently gained a much wider acceptance in television programming. CC is the transcription of dialog on a television program, to appear in small blocks or "captions" at the bottom or top of a television screen, while the television program is in progress. Typically, CC follows the actual dialog on the television program by only a few seconds. CC is generally a word-for-word transcription of the dialog as it occurs among the participants of a television program.

CC is not limited to the television environment. For example, movies designated for the big screens at theaters have used CC from time-to-time in foreign language films to provide an interpretation for viewers who may not understand the foreign language. In recent years televised courtroom trials have used CC.

Computer networks are also growing in popularity as very large networks are now offering information services to millions of subscribers. A popular feature of such networks are electronic discussion groups sometimes referred to as "bulletin boards" or FORUMS® (a registered service mark of CompuServe Incorporated). In these discussion groups, two or more users (typically using their home or office microcomputers, connected by modem to the network and/or bulletin board) exchange messages over the network, on a variety of subjects. Some discussion groups are restricted to a certain subject, while others are unrestricted.

The discussion starts by one user posting a message onto the particular electronic format in use. This message can then be viewed by a second user, accessing the discussion group, on the second user's microcomputer terminal. The second user can then respond to the first user's message by entering a reply through the second user's keyboard. The second user's reply can then be viewed by the first user, at the first user's microcomputer. Additional users can access the discussion group in the same manner.

Although the above described methods of CC and electronic discussion groups have been provided for background purposes, they should not be used to limit the scope of the present invention to the particular descriptions provided. There remain other implementations of CC and electronic discussion groups known to those of ordinary skill in the art, which would be applicable for use as a part of the present invention, and as such are within the scope of the present invention.

The present invention is a unique system for providing CC directly into an electronic discussion group in substantially real time. With the present invention, a person logged onto an electronic discussion group about a particular television program, may receive CC from the television program directly into his microcomputer. The person may then respond, via his microcomputer, to people on the television program (receiving the responses through a terminal or other data receiving device in the television studio), as the program is ongoing. Thus, the participants in the television program may "interact" with the electronic discussion group. This interaction may involve continuing electronic discussion between the television program participants and the electronic discussion group members.

Additionally, video clips may be incorporated with the present invention. For example, members of the electronic discussion group may receive graphical images of the television studio, on the members' microcomputer terminals. The video clips or images may be transmitted periodically to the members' screens to enable them to see the television program at their microcomputer, without need for a television. The microcomputers are preferably capable of showing the video clips on a portion of the terminal screen, while another portion of the screen is displaying CC and entered messages.

DETAILED DESCRIPTION OF PREFERRED EMBODIMENT(S)

Figure 1:
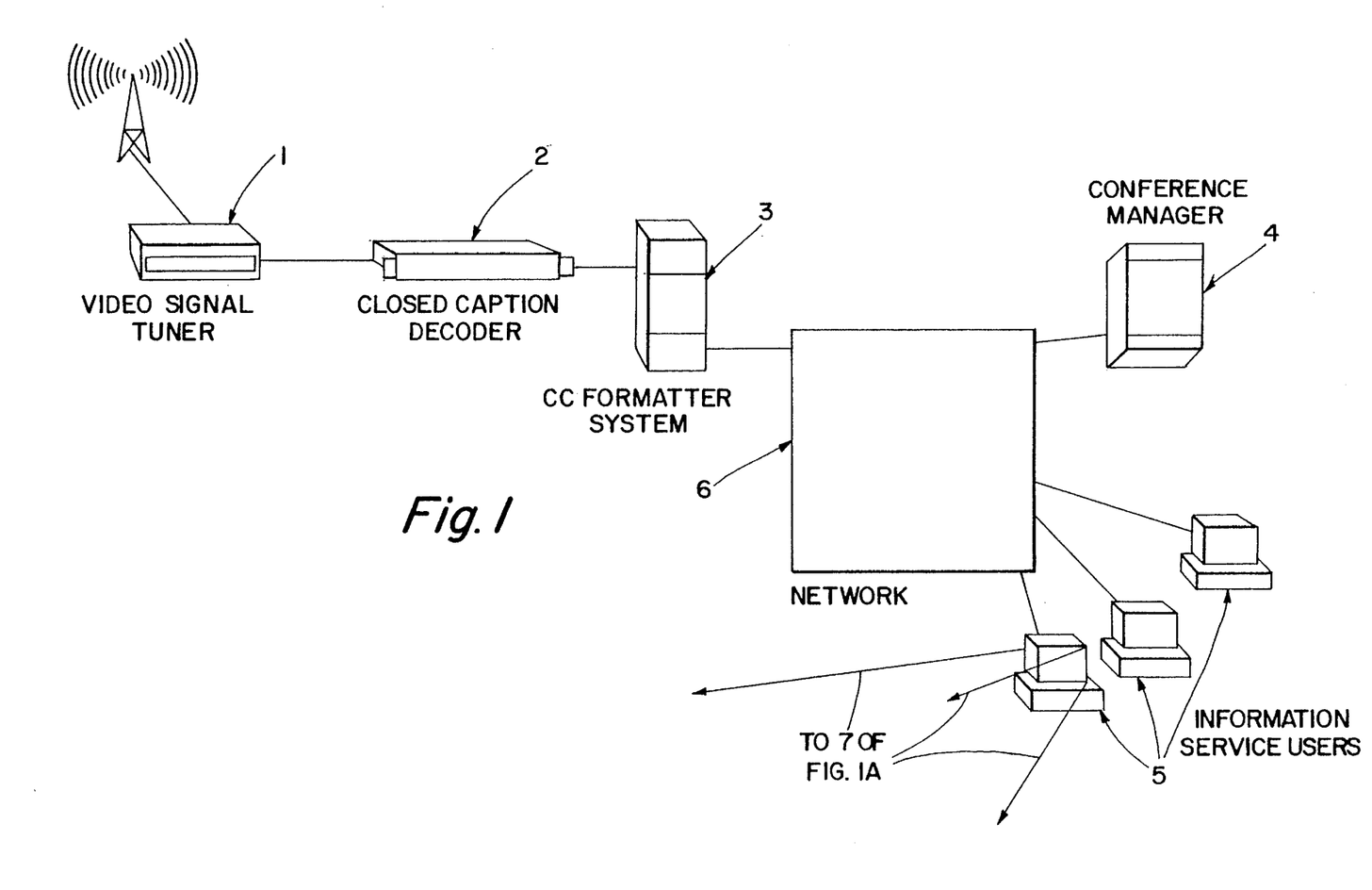
FIG. 1 is a diagrammatical view of one preferred embodiment of the system of the present invention, for use in providing closed captioning to a computer network.
Figure 1A:
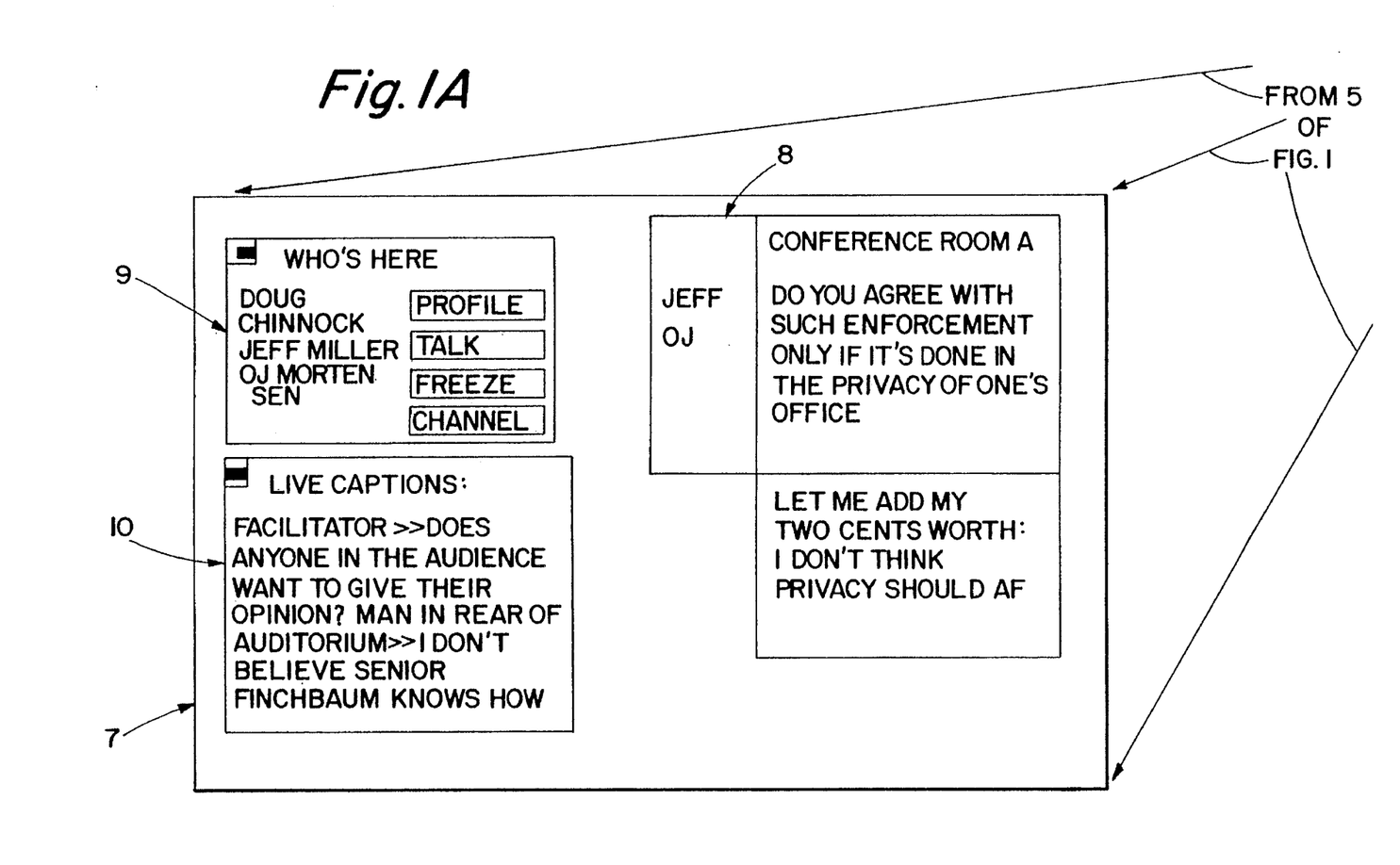

Referring now to the drawings, and particularly FIG. 1, a computer network is shown at 6, having users 5 involved in an electronic discussion group or conference. A network conference provides an electronic means for participants in a discussion to see each others statements and communicate ideas to all participants. Each member of a conference has a computer so connected to all others' computers that his comments are automatically sent to all parties. Preferably, he also receives all comments from all other parties. In addition to viewing the foregoing, the text 10 of a television talk show, for example, is displayed on a portion of each computer screen.

The following steps gain a user entry into a conference:

1. Start the Information Manager associated with the user's network service.
2. Gain access to the information service.
3. Select and enter the discussion group that has scheduled the conference.
4. Enter the desired conference room.

At this point the Conference Manager 4 will have compiled connection details and names of all participants. Whenever a line of information is received from one participant, a copy of the sender's name and the information is sent to all other participants. When each participant's display program receives this information, it preferably separately displays the information in appropriate places on the screen.

After steps 1 to 4, above, are performed and a connection from a CC formatter 3 has been established, the Manager 4 does the following:

For lines of information received from each participant, a copy of the sender's name and the information is sent to all other participants;

For lines of CC text received from the CC formatter, the formatter name and the CC information 9 is sent to all participants;

Each Information Manager program preferably separates the sender's name from the lines of information and places participant information in a "conference" room window 8. It similarly separates the CC formatter's name from CC text and places CC information in a CC window 10.

A conference that includes Closed Caption monitoring may start with the CC Formatter System 3 gaining access to the information service and proceeding to enter a specified discussion group and a CC Conference Room. It provides the group with a "CC ID" to be used for subsequent messages. This is effected with a connection over the Network 6 to the Conference Manager 4.

The CC Formatter System 3 proceeds to accept data from a Closed Caption Decoder 2, to rearrange the data for display in a caption window 10, and to send it, through the network 6 to the Conference Manager 4. A Decoder 2 may be purchased from a number of companies, such as EEG Enterprises, Inc., in Farmingdale, N.Y.

The Closed Caption Decoder 2 is connected to a Television Video Signal Tuner 1 that is tuned to a channel that carries Closed Caption material appropriate for the pending conference. It extracts out of the NTSC signal the CC characters and sends them on to the CC Formatter System 3.

Users 5 join the conference by invoking an Information Manager on their personal systems and directing it to access the same discussion group and enter a User Conference Room. They select a "user ID" to be used during the conference. They may choose to monitor the CC Conference Room as well as the User Conference Room. Users utilize the services of the network 6 and Conference Manager 4.

At this point all the elements of a Closed Caption Enhanced Conference are active. Whenever a user 5 completes a line of text in his User Conference Window 8, his Information Manager sends it through the Network 6 to the Conference Manager 4. The Conference Manager 4 prepends the User Conference Room identity and the user's ID and broadcasts the User's line, through the Network, to all other participants who have selected the specified User Conference Room 5. The user's ID and text are received by the user's Information Managers and displayed in the conference section of the User Conference Window 8.

Whenever the Conference Manager 4 receives a line from the CC Formatter System 3, it prepends the CC Conference Room identity and the CC ID and broadcasts the CC line, through the Network, to all participants who have selected to monitor the CC Conference Room 5. This text and ID are displayed by the user's Information Manager in the CC Conference Section of their User Conference Window 10.

Users may direct their Information Managers to ask the Conference Manager to provide them with concurrent updates of the conference status. This information is displayed in a Conference Status Window 9 by the Information Managers.

Figure 2:
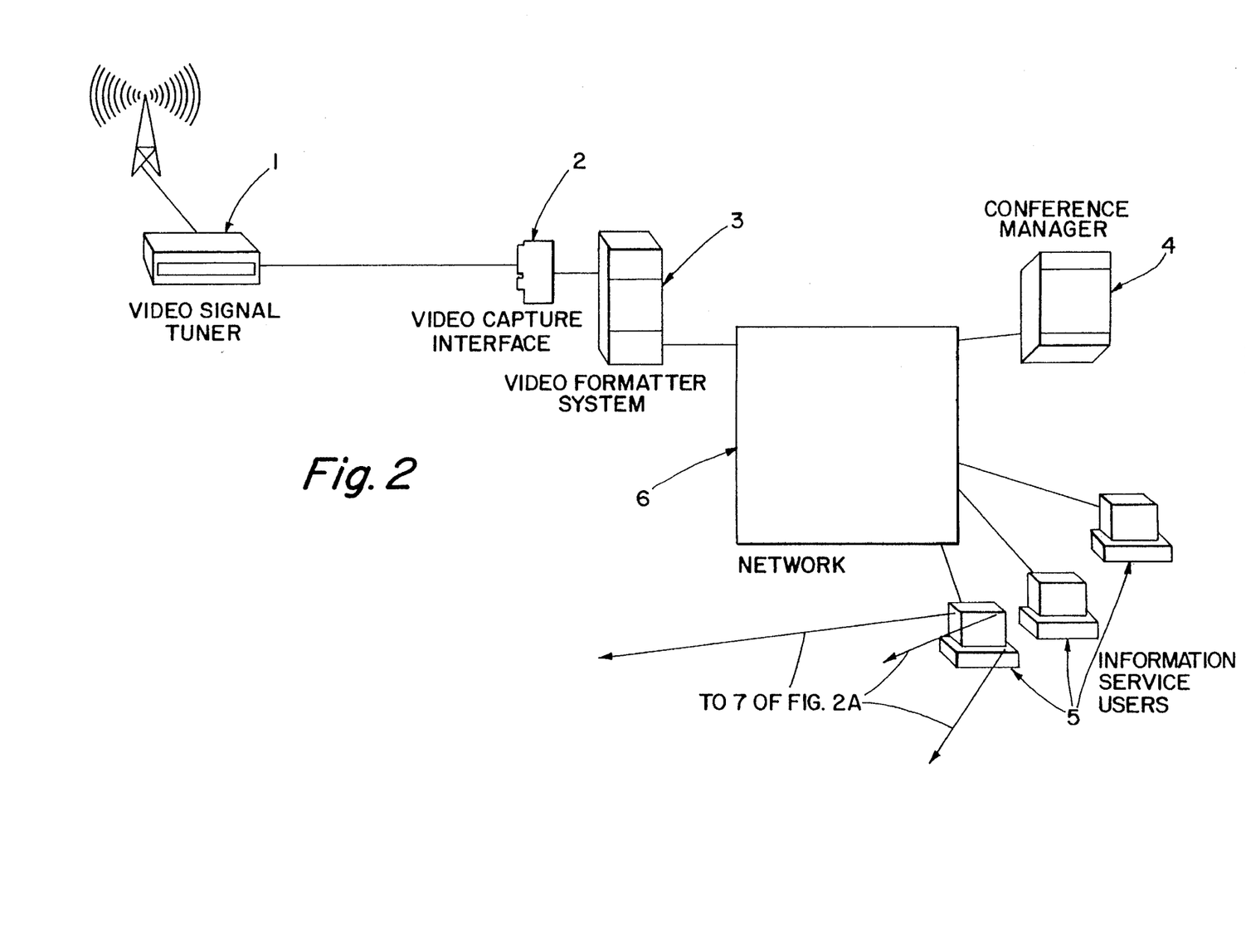
FIG. 2 is a diagrammatical view of another preferred embodiment of the system of the present invention, for use in providing video clips to a computer network.
Figure 2A:
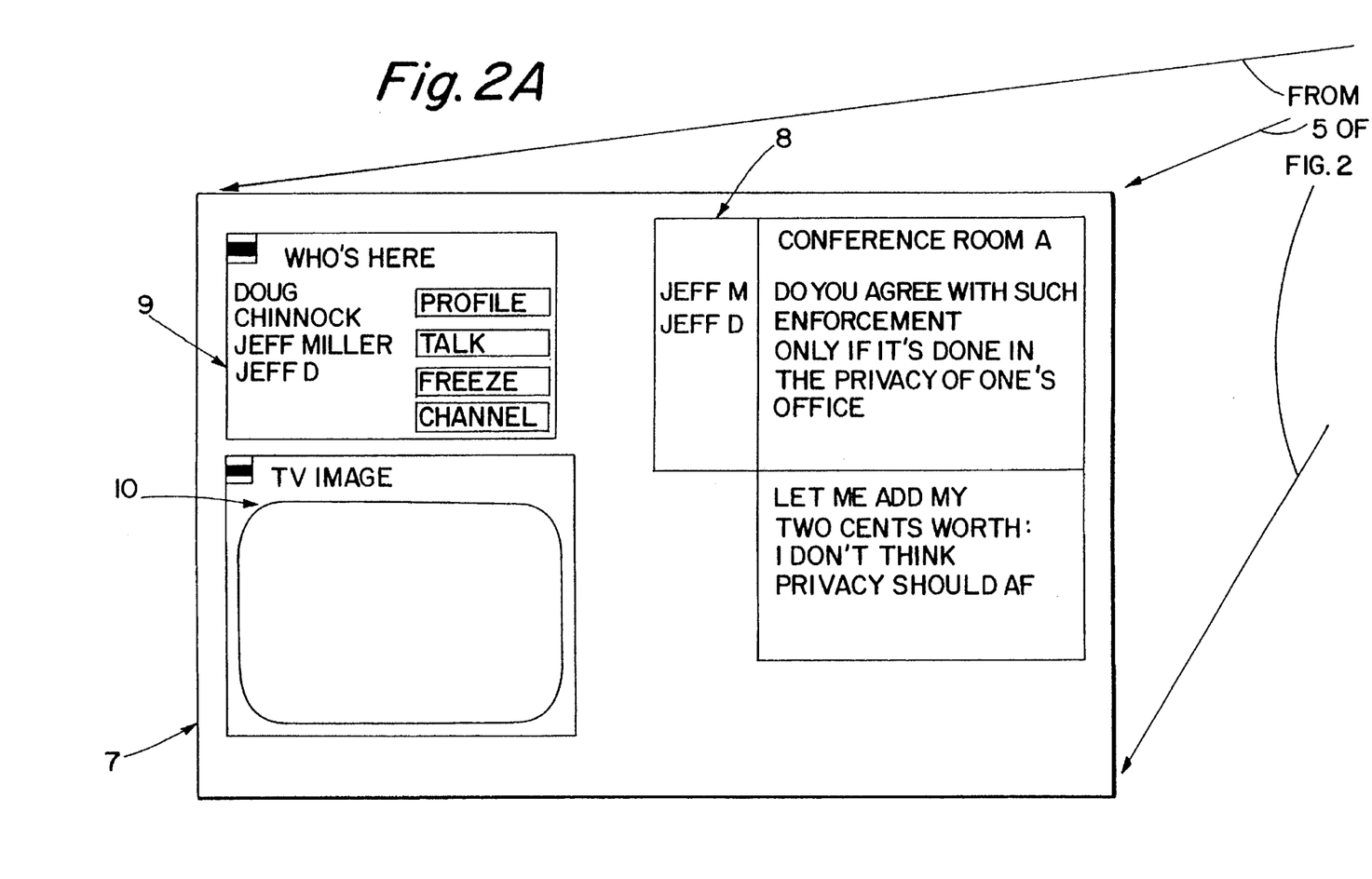

Referring now to FIG. 2, a video enhanced conference is shown. The following steps gain a user entry into a conference:

1. Start the Information Manager.
2. Gain access to the information service.
3. Select and enter the discussion group that has scheduled the conference.
4. Enter the desired conference room.

At this point the Conference Manager will have compiled connection details and names of all participants. Whenever a line of information is received from one participant, a copy of the sender's name and the information is sent to all other participants. When each participant's Information Manager receives the information, it separately displays the parts in appropriate places on the screen.

After steps 1 to 4, above, are performed and a connection from the Video Formatter System and the CC Formatter System has been established, the Manager does the following:

For lines of information received from each participant, a copy of the sender's name and the information is sent to all other participants;

For Image Protocol Data Units received from the Video Formatter System, the IPDU is sent to all participants;

Each Information Manager separates the sender's name from the lines of information and places participant information in a "conference" room window, places a copy of the image in an image window and separates the CC formatter's name from CC text and places CC information in a CC window;

A conference that includes TV image monitoring may start with the Video Formatter System 3 gaining access to the information service and proceeding to enter a specified discussion group and an Image Conference Room. This is effected with a connection over the Network 6 to the Conference Manager 4.

The Video Formatter System 3 proceeds to accept data from the Video Capture Interface 2, to insert the image data into IPDUs for display in an image window 10, and to send them, through the network 6 to the Conference Manager 4.

The Video Capture Interface 2 is connected to a Television Video Signal Tuner 1 that is tuned to a channel that carries Video material appropriate for the pending conference. It extracts out of the NTSC signal the Image data and makes it available to Video Formatter System 3.

Users 5 join the conference by invoking an Information Manager that is directed to access the same discussion group and enter a User Conference Room. They may choose to monitor the Video Conference Room. Users utilize the services of the network 6 and Conference Manager 4.

At this point, all the elements of a Video Image Enhanced Conference are active. Whenever a user 5 completes a line of text in his User Conference Window 8, his Information Manager sends it through the Network 6 to the Conference Manager 4.

The Conference Manager 4 prepends the User Conference Room identity and the user's ID and broadcasts the User's line, through the Network, to all other participants who have selected the specified User Conference Room 5. The user's ID and text are received by the user's Information Managers and displayed in the conference section of the User Conference Window 8.

Whenever the Conference Manager 4 receives an IPDU from the Video Formatter System 3, it broadcasts it, through the Network, to all other participants who have selected to monitor the Image Conference Room 5. The IPDUs are received by the user's Information Managers and displayed in the Image Conference Section of the User Conference Window 10.

Users may direct their Information Managers to ask the Conference Manager 4 to provide them with concurrent updates of the conference status. This information is displayed in a Conference Status Window 9 by the Information Managers.

Figure 3:
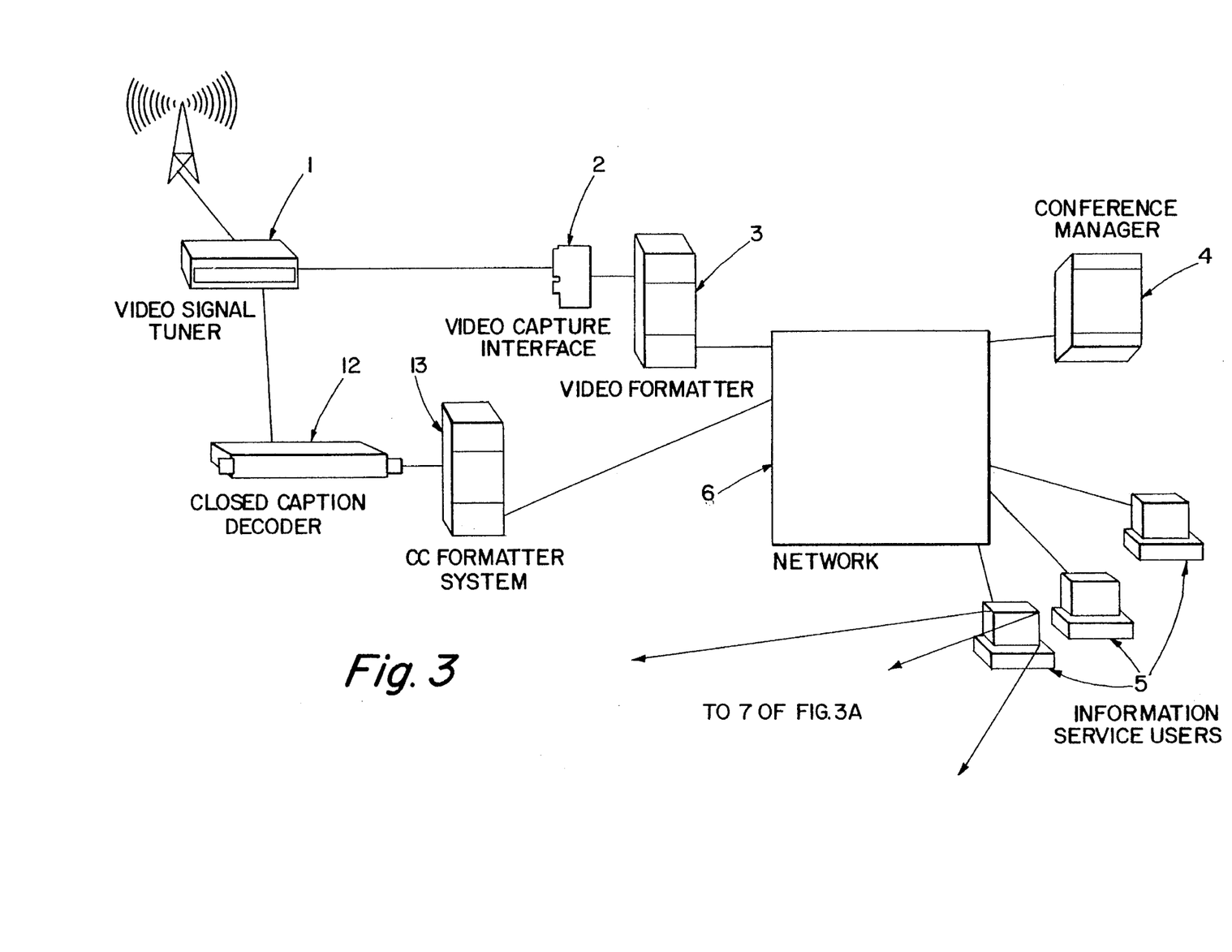
FIG. 3 is a diagrammatical view of another preferred embodiment of the system of the present invention for use in providing both closed captioning and video clips to a computer network.
Figure 3A:
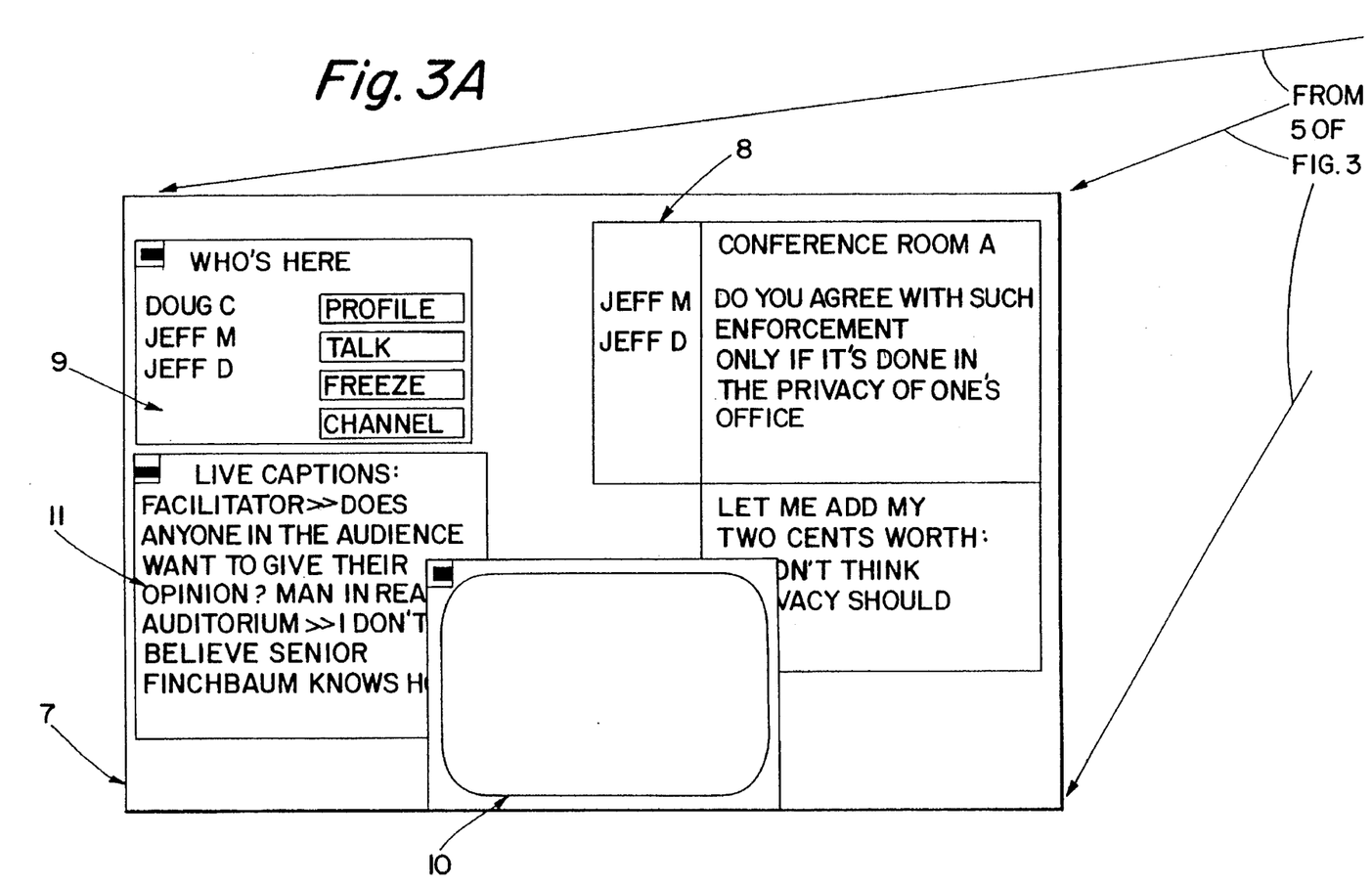

Referring to FIG. 3, a conference having CC and video clips is shown. A conference that includes TV image monitoring may start with the Video Formatter System 3 gaining access to the information service and proceeding to enter a specified discussion group and an Image Conference Room. This is effected with a connection over the Network 6 to the Conference Manager 4.

The Video Capture Interface 2 is connected to a Television Video Signal Tuner 1 that is tuned to a channel that carries Video material appropriate for the pending conference. It extracts out of the NTSC signal the Image data and makes it available to Video Formatter System 3.

A conference that also includes Closed Caption monitoring may proceed with the CC Formatter System 13 gaining access to the information service and proceeding to enter the specified discussion group and a CC Conference Room. It provides the discussion group with a "CC ID" to be used for subsequent messages. This is effected with a connection over the Network 6 to the Conference Manager 4.

The Video Formatter System 13 proceeds to accept data from the Video Capture Interface 12, to insert the image data into IPDUs for display in an image window 10, and to send them, through the network 6 to the Conference Manager 4.

Users 5 join the conference by invoking an Information Manager that is directed to access the same discussion group and enter a User Conference Room. They may choose to monitor the Vide Conference Room and/or the CC Conference Room. Users utilize the services of the network 6 and Conference Manager 4.

At this point all of the elements of a Video Image Enhanced Conference are active. Whenever a user 5 completes a line of text in his User Conference Window 8, his Information Manager sends it through the Network 6 to the Conference Manager 4. The Conference Manager 4 prepends the User Conference Room identity and the user's ID and broadcasts the User's line, through the Network, to all other participants who have selected the specified User Conference Room 5. The user's ID and text are received by the user's Information Managers and displayed in the conference section of the User Conference Window 8.

Whenever the Conference Manager 4 receives an IPDU from the Video Formatter System 3, it broadcasts it, through the Network, to all other participants who have selected to monitor the Image Conference Room 5. The IPDUs are received by the user's Information Managers and displayed in the Image Conference Section of the User Conference Window 10.

Whenever the Conference Manager 4 receives a line from the CC Formatter System 13, it prepends the CC Conference Room identity and the CC D and broadcasts the CC line, through the Network, to all participants who have selected to monitor the CC Conference Room 5. This text and ID are displayed by the user's Information Managers in the CC Conference Section of their User Conference Window 11.

Users may direct their Information Managers to ask the Conference Manager 4 to provide them with concurrent updates of the conference status. This information is displayed in a Conference Status Window 9 by the Information Managers.

The Conference Manager 4 may be enabled to analyze the text coming from the CC Formatter System 12. When so enabled, it categorizes incoming CC text and selects data routing actions accordingly. These actions include:

1. Redirecting the CC data to a specific CC Conference Room;

2. Redirecting incoming IPDUs to a specific Image Conference Room.

The present invention has been described in the form of several embodiments. It is to be recognized that variations of these embodiments would be apparent to those of skill in the art, and are intended to fall within the scope of the following claims. Many of the features described above are not needed to benefit from the present invention but are only described to show a preferred way of implementing the invention.

What is claimed is:

1. An enhanced electronic discussion group, comprising:

electronic messages entered from computer users onto said discussion groups;

closed captioning from a video broadcast entered onto said discussion group; and electronic replies to said closed captioning entered from said computer users onto said discussion group.

2. A system for operating an electronic discussion group, said system comprising:

posting an electronic message from a computer user onto said discussion group;

capturing a closed caption dialog from a video program and posting said closed caption onto said discussion group;

posting a reply to said closed caption onto said discussion group.

3. The system of claim 2, wherein said closed caption capturing is accomplished with a closed caption decoder in electronic communication with a video signal tuner.

* * * * *

UNITED STATES PATENT AND TRADEMARK OFFICE
CERTIFICATE OF CORRECTION

PATENT NO. : 5,615,131

DATED : Mar. 25, 1997

INVENTOR(S) : Owen J. Mortensen, et al

It is certified that error appears in the above-identified patent and that said Letters Patent is hereby corrected as shown below:

In column 6, line 3, please delete the word "D" and replace it with --ID--.

Signed and Sealed this

Twenty-fourth Day of June, 1997

Attest:

BRUCE LEHMAN

Attesting Officer

Commissioner of Patents and Trademarks